115,818

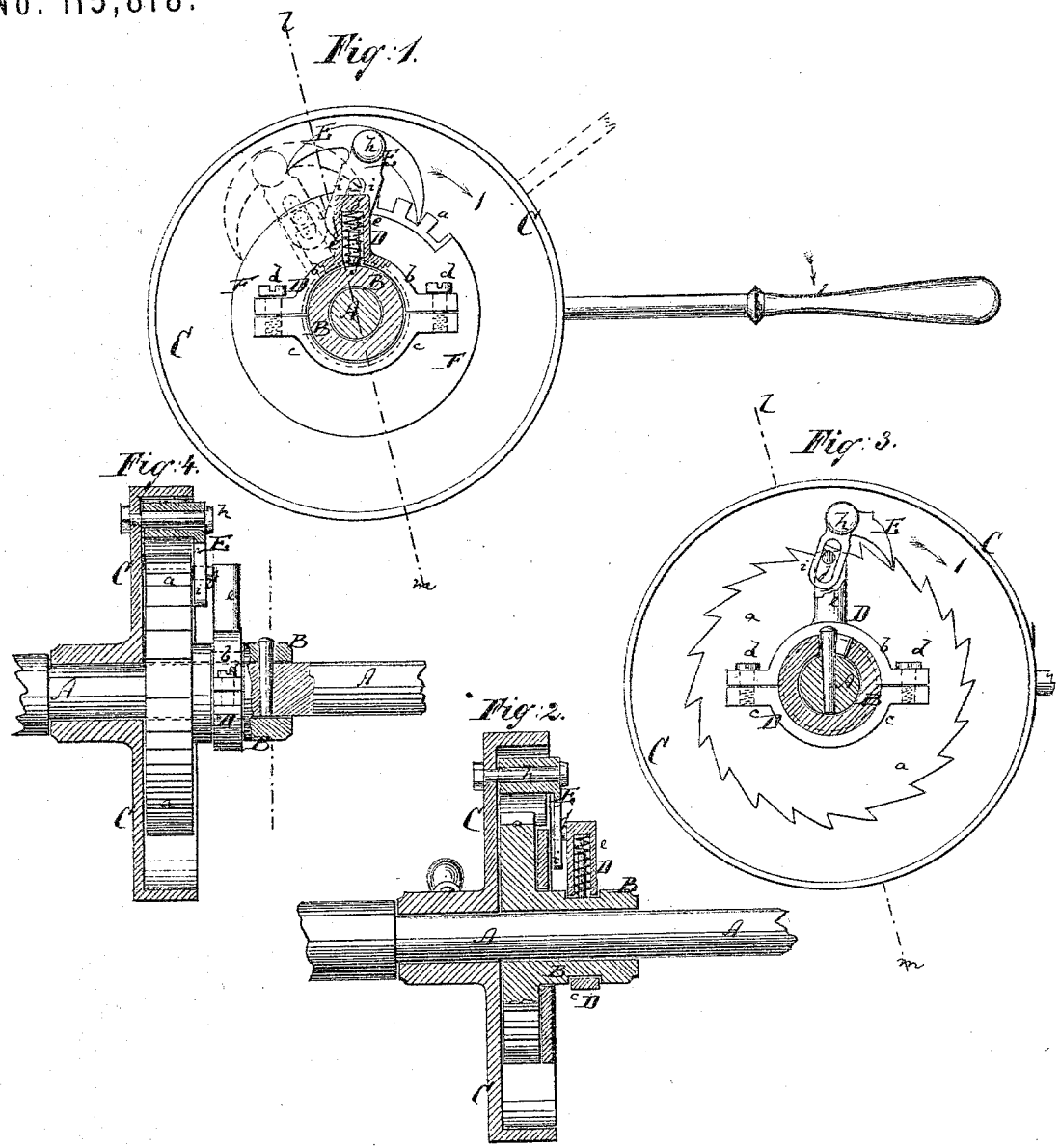

UNITED STATES PATENT OFFICE.

WILLIAM C. BURCH AND GEORGE D. OATLEY, OF GLOUCESTER, NEW JERSEY.

IMPROVEMENT IN FRICTION-CLUTCHES.

Specification forming part of Letters Patent No. 115,818, dated June 13, 1871.

*To all whom it may concern:*

Be it known that we, WILLIAM C. BURCH and GEORGE D. OATLEY, of Gloucester, in the county of Camden and State of New Jersey, have invented a new and Improved Friction-Clutch; and we do hereby declare that the following is a full, clear, and exact description thereof, which will enable others skilled in the art to make and use the same, reference being had to the accompanying drawing forming part of this specification, in which—

Figure 1 represents a face view, partly in section, of our improved friction-clutch, showing it connected with a double pawl. Fig. 2 is a longitudinal section of the same. Fig. 3 is a sectional face view of the same, showing it connected with a single pawl. Fig. 4 is a side view, partly in section, of the same.

Similar letters of reference indicate corresponding parts.

This invention relates to a new friction-dog to be used in all catch or clutch boxes of cotton and woolen and other machinery; and it consists in the application of a friction-spring to the loose sleeve and dog that operate the pawl, so that by said spring the dog will be carried to the same side toward which the shaft is turning to let the pawl act in the same direction. When the motion of the shaft is reversed the dog will be swung to the other side, to reverse also the action of the pawl or throw the same entirely out of gear.

A in the drawing represents the shaft on which the collar B, carrying the gear-wheel $a$ and the loose friction-dog, is hung loose. C is the shell-plate, hung also loose on the shaft. The dog D consists of two straps, $b$ $c$, fitted around a grooved portion of the collar B, and connected by screws $d$. From the upper strap projects an upright hollow pillar, $e$, within which a spiral spring, $f$, and leather piston $g$ are arranged, the spring holding the piston upon the collar. E is a pawl, pivoted at $h$ to the shell-plate, and provided with a slotted arm, $i$, through which a pin, $j$, projecting from the pillar $e$, passes. These features are all fully shown in Figs. 1 and 2, where the gear-wheel $a$ is represented with straight teeth and the pawl with double prongs to operate on the wheel in either direction. In front of the straight-toothed gear-wheel is placed a notched disk, F, which can, by means of suitable connection or leverage, be set so as to permit one prong of the pawl to enter the teeth, while the other prong will be kept away therefrom by the edge of the disk projecting beyond the ends of the teeth. As the shell-plate is turned in the direction of the arrow I the dog is, by the friction of its spring and piston, carried along in the same direction until it inclines from its neutral and central position, represented by the line $l$ $m$, so as to throw the pawl into gear, as is clearly shown in Fig. 1, and carry the collar along. When the shell-plate is turned in the opposite direction it will carry the dog to the other side of the line $l$ $m$, as indicated by dotted lines in Fig. 1; but in this position the pawl will encounter the edge of the disk F and not move the gear-wheel and collar. In place of the straight-toothed wheel and double pawl a common ratchet-wheel and single pawl may be used in connection with the same dog, as shown in Figs. 3 and 4, in which case the disk F is dispensed with, as the dog is always to operate in one direction only and never in the other, while the double pawl could be caused to operate in either direction by adjusting the disk F accordingly.

Having thus described our invention, we claim as new and desire to secure by Letters Patent—

The friction-dog D, provided with the hollow pillar $e$, spring $f$, piston $g$, and pin $j$, and combined with the slotted arm $i$ of the pawl E, to operate substantially as herein shown and described.

WILLIAM C. BURCH.
                    GEORGE D. OATLEY.

Witnesses:
  EDWARD MILLS,
  HENRY J. WEST.